J. H. POST.
FOUR HORSE EQUALIZER.
APPLICATION FILED MAY 17, 1912.
1,037,310.
Patented Sept. 3, 1912.
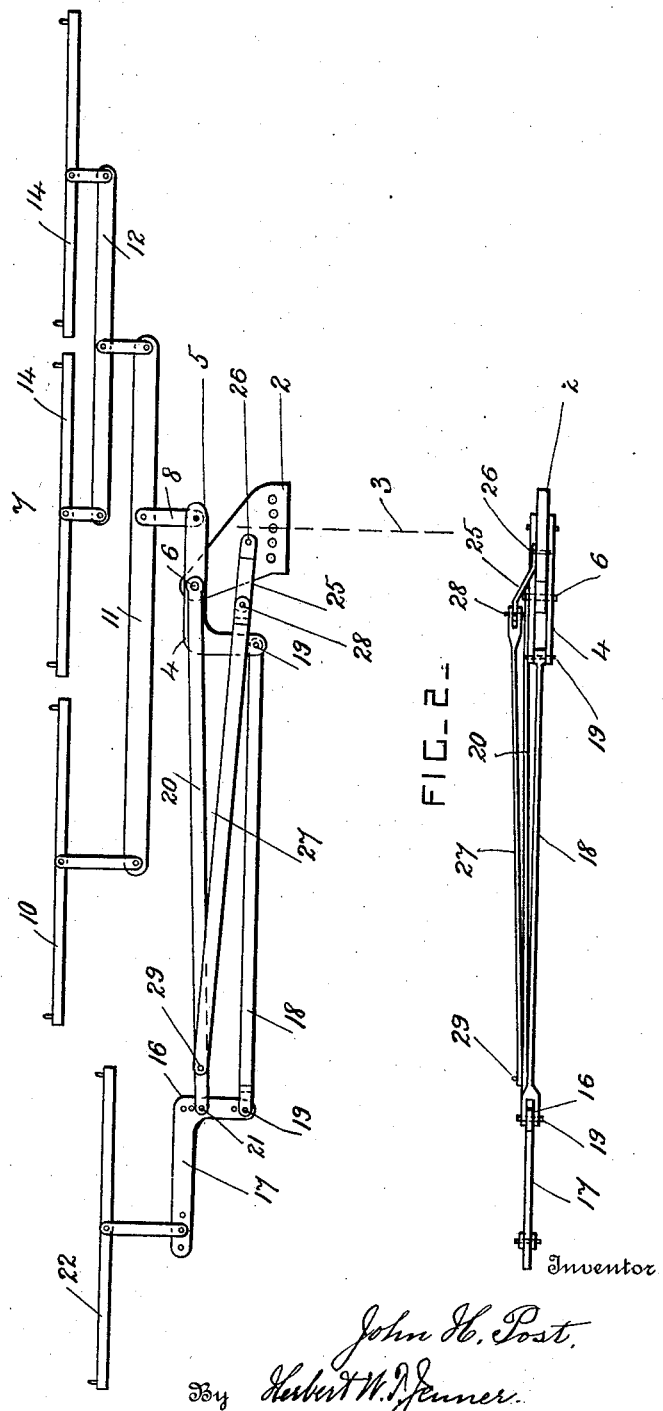
Witnesses
A. E. Davis.
Wm. H. Bates
Inventor
John H. Post,
By Herbert W. Jenner.
Attorney

UNITED STATES PATENT OFFICE.

JOHN H. POST, OF FLANAGAN, ILLINOIS.

FOUR-HORSE EQUALIZER.

1,037,310.  Specification of Letters Patent.  Patented Sept. 3, 1912.

Application filed May 17, 1912. Serial No. 697,995.

*To all whom it may concern:*

Be it known that I, JOHN H. POST, a citizen of the United States, residing at Flanagan, in the county of Livingston and State of Illinois, have invented certain new and useful Improvements in Four-Horse Equalizers; and I do hereby declare the following to be a full, clear, and exact description of the invention, such as will enable others skilled in the art to which it appertains to make and use the same.

This invention relates to four horse equalizers for use in connection with plows; and it consists in the novel construction and combination of the parts hereinafter fully described and claimed.

In the drawings, Figure 1 is a plan view of a four horse equalizer constructed according to this invention. Fig. 2 is an end view of the rear part of the equalizer.

The plow beam is rigidly connected to the rear part of a draft plate 2, so that the plow cannot move pivotally of the draft plate, and the line 3 represents the normal line of draft of the plow. The draft plate 2 is shaped like a scalene triangle, and the plow is connected to its shortest side. A bell-crank lever 4 has the middle part of its longer arm 5 pivoted by a pin 6 to the apex of the plate 2, and the pin 6 is arranged on the same side of the line of draft as the shorter arm of the bell-crank lever 4, which arm is arranged to project rearwardly. A three horse equalizer 7 is connected to the free end portion of the longer arm 5 by a link 8, and so that the three horses are arranged one on the center line of draft, and the other two on equal distances on each side of it. The three horse equalizer preferably has a whiffletree 10 connected to the long end of an equalizing bar 11, and a doubletree 12 connected to the shorter end of the equalizing bar 11. Two whiffletrees 14 are connected to the doubletree 12, one at each end thereof.

The bell-crank lever 4 preferably consists of two plates secured parallel to each other. A second bell-crank lever 16 is provided, and its longer arm 17 is arranged to project in the opposite direction from the longer arm 5 of the bell-crank lever 4. A coupling-rod 18 is pivoted by pins 19 to the rear end portions of the shorter arms of the two bell-crank levers. A second coupling-rod 20 is arranged in front of the coupling-rod 18, and is pivoted at one end on the pin 6, and at the other end by a pin 21 to the angle portion of the outer bell-crank lever 16. A whiffletree 22 is connected to the longer arm 17 of the bell-crank lever 16, and this bell-crank lever 16 has a plurality of holes for each of its pivot pins, as shown, so that adjustment may be effected to equalize the pull of the single horse at this point with the pull of the three horses of the three horse equalizer.

A short offset link 25 is pivoted by a pin 26 to the middle part of the draft plate 2, and a long link 27 is pivoted at one end to the link 25 by a pin 28. The other end of the long link 27 is pivoted by a pin 29 to the outer end portion of the coupling-rod 20 near the pin 21. The two links 25 and 27 are normally arranged in line with each other, and diagonally of the two coupling-rods, and the long link projects across the short arm of the bell-crank lever 4. The links 25 and 27, when in line with each other prevent the outer bell-crank lever 16 from being moved bodily forward, but permit it to move pivotally on the pin 21. These links move out of line with each other to permit the bell-crank lever to move bodily to the rear. These bell-crank levers and their connections equalize the pull of the four horses, and enable the four horses to be arranged to the best advantage for plowing, and so that they pull straight ahead, and pull the plow straight, and with due allowance for side draft.

What I claim is:

1. A four horse equalizer, comprising a draft plate for attachment to a plow beam, a bell-crank lever having the middle part of its longer arm pivoted to the draft plate, a three horse equalizer connected to the free-end portion of the said arm, an outer bell-crank lever having its longer arm projecting in the opposite direction from the longer arm of the first said bell-crank lever, a front coupling-rod and a rear coupling-rod pivotally connecting the two bell-crank levers, a whiffletree connected to the longer arm of the outer bell-crank lever, and two jointed links arranged diagonally of the coupling-rods and pivoted to the outer end portion of the front coupling-rod at one end and to the said draft plate at the other end.

2. A four horse equalizer, comprising a draft plate for attachment to a plow beam, a bell-crank lever having the middle part of its longer arm pivoted to the draft plate, a three horse equalizer connected to the free end portion of the said arm, an outer bell-crank lever having its longer arm projecting in the opposite direction from the longer arm of the first said bell-crank lever, a front coupling-rod and a rear coupling-rod pivotally connecting the two bell-crank levers, a whiffletree connected to the longer arm of the outer bell-crank lever, a long link pivoted at one end to the outer end portion of the front coupling-rod and extending diagonally across the shorter arm of the first said bell-crank lever, and a short offset link pivoted to the long link and to the said draft plate and normally arranged in line with the long link.

In testimony whereof I have affixed my signature in the presence of two witnesses.

JOHN H. POST.

Witnesses:
J. H. LINNEMAN, Jr.,
BEN WICHMAN.

Copies of this patent may be obtained for five cents each, by addressing the "Commissioner of Patents, Washington, D. C."